(12) United States Patent
Park

(10) Patent No.: US 7,202,864 B2
(45) Date of Patent: Apr. 10, 2007

(54) APPARATUS AND METHOD FOR DRIVING A LIQUID CRYSTAL DISPLAY

(75) Inventor: Jong Jin Park, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 544 days.

(21) Appl. No.: 10/268,836

(22) Filed: Oct. 11, 2002

(65) Prior Publication Data

US 2003/0122753 A1 Jul. 3, 2003

(30) Foreign Application Priority Data

Dec. 27, 2001 (KR) .................. 10-2001-0085966

(51) Int. Cl.
*G09G 5/00* (2006.01)
(52) U.S. Cl. ..................... 345/211; 345/212
(58) Field of Classification Search ................ 345/211, 345/212, 87
See application file for complete search history.

(56) References Cited

U.S. PATENT DOCUMENTS

| | | | | |
|---|---|---|---|---|
| 5,933,199 | A * | 8/1999 | Yoon ........................... | 348/674 |
| 6,356,252 | B2 * | 3/2002 | Park ............................. | 345/87 |
| 6,671,009 | B1 * | 12/2003 | Hattori et al. ................ | 349/33 |

FOREIGN PATENT DOCUMENTS

| CN | 1327546 | 12/2001 |
|---|---|---|
| JP | 09-138421 | 5/1997 |
| JP | 09-185032 | 7/1997 |
| JP | 09-185037 | 7/1997 |
| JP | 10-206822 | 8/1998 |
| JP | 2000-321556 | 11/2000 |
| JP | 2000-347634 | 12/2000 |
| JP | 2000-347636 | 12/2000 |
| JP | 2001-083479 | 3/2001 |
| JP | 2001-083552 | 3/2001 |
| JP | 2001-290121 | 10/2001 |
| JP | 2001-290127 | 10/2001 |
| JP | 2001-296519 | 10/2001 |
| JP | 2002-006284 | 1/2002 |
| WO | WO 01/29612 | 4/2001 |

\* cited by examiner

*Primary Examiner*—Sumati Lefkowitz
*Assistant Examiner*—Ke Xiao
(74) *Attorney, Agent, or Firm*—Morgan, Lewis & Bockius, LLP

(57) ABSTRACT

An apparatus for driving a liquid crystal display that includes a normal driving interval for providing normal driving of the liquid crystal display with a real-data signal after a reset period, wherein the liquid crystal display includes a liquid crystal between pixel and common electrodes in which the liquid crystal is transitioned from a splay state into a bend state at a voltage difference between the pixel and common electrodes greater than a transition voltage. The apparatus includes a reset circuit for setting a voltage difference between the pixel electrode and the common electrode during the reset period to be larger than an average voltage of the real-data signal in said normal driving interval and a controller for controlling voltages that are supplied to at least one of the pixel electrode and the common electrode.

15 Claims, 12 Drawing Sheets

SPLAY　　　　　　　　　　　　BEND

APPARATUS AND METHOD FOR DRIVING A LIQUID CRYSTAL DISPLAY

The present invention claims the benefit of Korean Patent Application No. P2001-85966 filed in the Republic of Korea on Dec. 27, 2001, which is hereby incorporated by reference in its entirety.

BACKGROUND OF THE INVENTION

1. Field of the Invention

This invention relates to a technique for driving a liquid crystal display, and more particularly to an apparatus and method for driving a liquid crystal display wherein a liquid crystal can make a rapid transition from a splay state into a bend state.

2. Description of the Related Art

Generally, a liquid crystal display (LCD) panel controls light transmittance of each liquid crystal cell in response to video signals to thereby display a picture. A liquid crystal display panel of an active matrix type includes a switching device for each liquid crystal cell and thus makes each cell more really adaptive to a moving picture. In the active matrix LCD display, a thin film transistor (TFT) is mainly used as the switching device. Since such an LCD panel can be made with a smaller-device size than existent cathode ray tube displays, the LCD panel has been widely used as a monitor in a personal computer or a notebook computer, as well as, in office automation equipment, such as a copy machine, and in portable equipment, such as a cellular phone or pager.

As shown in FIG. 1, a conventional LCD panel includes a digital video card 30 for converting an analog video signal into a digital video data, a power supply 42 for supplying driving voltages, a data driver 36 for supplying video data to data lines DL of the LCD panel 40, a gate driver 34 for sequentially driving gate lines GL of the LCD panel 40, a controller 32 for controlling both the data driver 36 and the gate driver 34, and a gamma voltage generator 38 for applying a gamma voltage to the data driver 36.

In the LCD panel 40 as shown in FIG. 1, a liquid crystal (not shown) is injected between two glass substrates (not shown). The gate lines GL and the data lines DL are formed on the lower glass substrate in such a manner to be perpendicular to each other. In an area adjacent to an intersection between each of the gate lines GL and the data lines DL, a thin film transistor (TFT) is positioned for selectively applying image data inputted from the data lines DL to a liquid crystal cell. To this end, the TFT has a gate terminal (not shown) connected to the gate line GL and a source terminal (not shown) connected to the data line DL. The drain terminal (not shown) of the TFT is connected to a pixel electrode PIXE of a liquid crystal cell.

The digital video card 30 converts an analog image signal into a digital image signal suitable for the LCD panel 40 and detects a synchronous signal included in the analog image signal. The controller 32 receives a driving voltage representative of the digital image signal in voltage range 0~3.3V from the digital video card 30. The controller 32 supplies red, green and blue digital video data to the data driver 36. Further, the controller 32 generates a dot clock Dclk and a gate start pulse GSP using horizontal/vertical synchronizing signals H and V inputted from the digital video card 30 to provide a timing control of the data driver 36 and the gate driver 34. More particularly, the dot clock Dclk is supplied to the data driver 36 while the gate start pulse GSP is supplied to the gate driver 34.

The power supply 42 receives a low-level common voltage VCC of 0~3.3V supplied from the digital video card 30 to create a high level common voltage VDD for driving the liquid crystal cells and a driving voltage for driving the gate driver 34. Further, the power supply 42 converts the supplied low-level common voltage VCC of 0~3.3V into a high level common voltage of 15V and supplies it to the data driver 36. In addition, the power supply 42 converts the supplied low-level common voltage VCC of 0~3.3V into a gate high voltage VGH of 20V and a gate low voltage VGL of −5V and applies them to the gate driver 34 for a scanning signal in accordance with a gate scanning clock GSC. A common voltage Vcom of 7V is supplied as a common voltage to a common electrode COME on the upper substrate of the liquid crystal display panel by way of an Ag dot provided at a pad portion of the liquid crystal display panel.

The gate driver 34 includes a shift register for responding to the gate start pulse GSP inputted from the controller 32 to sequentially generate a scanning pulse, and a level shifter for shifting a voltage of the scanning pulse into a voltage level suitable for driving the liquid crystal cells. The gate driver 34 applies a gate high voltage VGH and a gate low voltage VGL to the liquid crystal display panel 40 through the gate lines GL. A scanning pulse with a gate high voltage VGH turns on the TFT, and switches video data supplied from the data driver 36 into the liquid crystal cell during a time interval when the TFT is turned on.

The dot clock Dclk from the controller 32, along with red, green and blue digital video data, is inputted to the data driver 36. The data driver 36 latches the red, green and blue digital video data in synchronization with the dot clock Dclk, and then corrects the latched data in accordance with a gamma voltage Vγ. Further, the data driver 36 converts the respective red, green and blue digital data corrected by the gamma voltage Vγ to respective red, green and blue analog data for application to the data lines DL of the LCD panel 40.

A twisted nematic (TN) mode is generally used in a liquid crystal for an LCD panel. In the TN mode, a twisted angle of the liquid crystal alignment is 90°, and an alignment state of the liquid crystal is changed in accordance with an application of an electric field such that the amount of transmission for light from a back light unit through the liquid crystal is controlled. By controlling the twist of the liquid crystal with an electric field, the amount of light transmitted can be varied along a gray scale. However, using the TN mode for a liquid crystal has the problems of a narrow viewing angle and a slow response speed.

To overcome these disadvantages of the TN mode, it has been suggested that liquid crystals can be used with an in-plane switch (IPS) mode or an optically compensated bend (OCB) mode. The OCB mode of the above-mentioned modes has a wider viewing angle and a faster response speed than the TN mode.

Referring to FIG. 2 and FIG. 3, the LCD panel of an OCB mode includes an upper substrate 10 sequentially provided with a color filter array (not shown) and an alignment film (not shown), a lower substrate 12 provided with a TFT array (not shown) and an alignment film (not shown), a liquid crystal 18 injected into a desired gap between the upper substrate 10 and the lower substrate 12 defined by a spacer (not shown), upper and lower polarizers 14 and 22 arranged respectively on the outsides of the upper and lower substrates 10 and 12, an upper compensating film 16 arranged between the upper substrate 10 and the upper polarizer 14, and a compensating film 20 arranged between the lower substrate 12 and the lower polarizer 22 to compensate a phase of an incident light for increasing a viewing angle.

The alignment films of the upper substrate 10 and the lower substrate 12 are subjected to an alignment treatment in the same direction. The liquid crystal 18 between the upper substrate 10 and the lower substrate 12 maintains a splay state, which is an initial alignment state in accordance with an alignment treatment direction of the alignment film when the voltage of an electric field between the upper and lower substrate is less than a specified voltage Vth. In other words, the liquid crystal molecules are arranged at tilt angles of $\theta°$ and $-\theta°$ at the surfaces of the upper and lower alignment films, respectively. The tilt angles of the liquid crystal molecules decrease towards the center of the liquid crystal cell such that liquid crystal molecules at the center have an angle of 0°, as shown in FIG. 3.

As shown in FIG. 4, the liquid crystal molecules arranged in the splay state irregularly transmit a light at a voltage V less than a specified voltage Vth. Accordingly, a stain or a flicker effect appears in the picture of an LCD panel for a short time when the liquid crystal molecules move from the splay state to the bend state at a specified voltage Vth.

The liquid crystal molecules having such a splay state transition into a bend state at a voltage more than the specified voltage Vth. The time required for transitioning the liquid crystal molecules from the splay state into a bend state is referred to as "transition time." The transition of the liquid crystal molecules from the splay state into a bend state requires a transition voltage or specified Vth of about at least 3V, as shown in FIG. 5. The tilt angles of the liquid-crystal molecules at the surfaces of the upper and lower alignment films when in the bend state is $\pm\theta$, wherein $\theta$ is usually about 5°~15°. However, the tilt angles of the liquid crystal molecules increase towards the center of the liquid crystal cell such that liquid crystal molecules at the center have an angle of 90°. Liquid crystal molecules in the bend state have a characteristic in which light transmittance linearly decreases as the voltage of the electric field increases between the upper and lower substrates. Therefore, the liquid crystal molecules having a bend state are suitable for implementing a gray scale and thus for realizing a picture in an LCD panel.

As described above, in the OCB mode, the liquid crystal is transitioned from the splay state into the bend state at a voltage greater than a transition voltage Vth and light transmittance is linear with respect to an applied voltage above the transition voltage Vth. When a voltage approximate to the transition voltage Vth is supplied, the transition from the splay state into the bend state for the liquid crystal requires a transition time of tens to hundreds of milliseconds. If it takes a long time to transition the liquid crystal, a stain-like appearance emerges in the picture on an LCD panel. Also, the time when flicker occurs in the picture is prolonged. Therefore, it is necessary to transition a liquid crystal from a splay state into a band state within a short time.

SUMMARY OF THE INVENTION

Accordingly, the present invention is directed to an apparatus and method for fabricating a liquid crystal display that substantially obviates on or more of the problems due to limitations and disadvantages of the related art. An object of the present invention is to provide an apparatus and method for driving a liquid crystal display wherein a liquid crystal can make a rapid transition from a splay state into a band state. Another object is to set a voltage difference between the pixel electrode and the common electrode during the reset period to be larger than an average voltage of the real-data signal in the normal driving interval.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages, and in accordance with the purpose of the present invention, as embodied and broadly described, an apparatus embodiment for driving a liquid crystal display that uses a normal driving interval for providing normal driving of the liquid crystal display with a real-data signal after a reset period, wherein the liquid crystal display includes a liquid crystal between pixel and common electrodes in which the liquid crystal is transitioned from a splay state into a bend state at a voltage difference between the pixel and common electrodes greater than a transition voltage, also includes a reset circuit for setting a voltage difference between the pixel electrode and the common electrode during the reset period to be larger than an average voltage of the real-data signal in said normal driving interval and a controller for controlling voltages that are supplied to at least one of the pixel electrode and the common electrode.

In another embodiment, a reset circuit for setting a voltage difference between a pixel electrode and a common electrode includes a driving circuit for driving the pixel electrode, a gamma voltage generator connected to the driving circuit, a first switch connected to the common electrode, wherein the first switch selects between a first voltage and a second voltage a second switch connected to a gamma voltage generator, wherein the second switch selects between a third voltage and a fourth voltage as a reference voltage for the pixel electrode and a controller for controlling a voltage difference between the pixel electrode and the common electrode using the first and second switches.

In another embodiment of the invention, a method of driving a liquid crystal display that includes a normal driving interval for providing normal driving of the liquid crystal display with a real-data signal after a reset period, wherein the liquid crystal display includes a liquid crystal between pixel and common electrodes in which the liquid crystal is transitioned from a splay state into a bend state at a voltage difference between the pixel and common electrodes greater than a transition voltage, also includes setting a voltage difference between the pixel and common electrodes during the reset period to be larger than an average voltage of the real-data signal in said normal driving interval, applying said voltage difference across the liquid crystal such that the liquid crystal is transitioned from the splay state into the bend state during the reset period, and driving the liquid crystal from the bend state after the reset period in the normal driving interval.

It is to be understood that both the foregoing general description and the following detailed description are exemplary and intended to provide further explanation of the invention as claimed.

BRIEF DESCRIPTION OF THE DRAWINGS

The accompanying drawings, which are included to provide further understanding of the invention and are incorporated in and constitute a part of the specification, illustrate embodiments of the invention and together with the description serve to explain the principles of the invention. These and other objects of the invention will be apparent from the following detailed description of the embodiments of the present invention with reference to the following drawings.

DETAILED DESCRIPTION OF THE PREFERRED EMBODIMENTS

Figure 1:
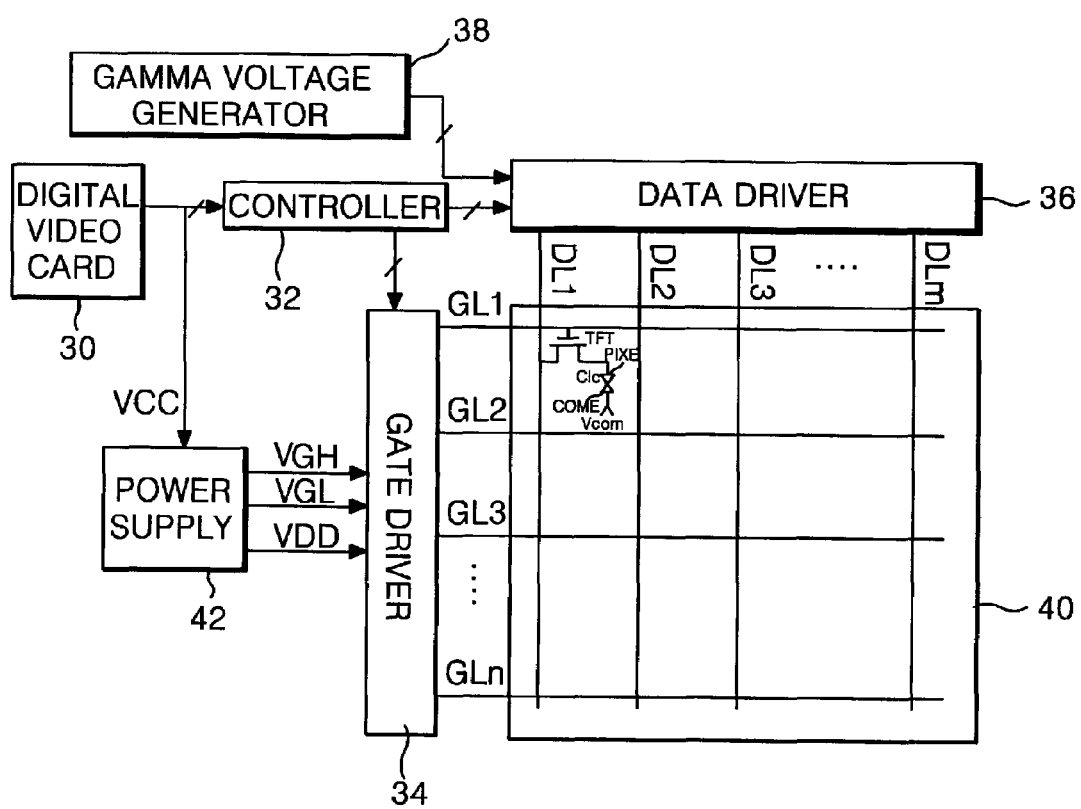
FIG. 1 is a diagram showing a configuration of a conventional LCD panel.
Figure 2:
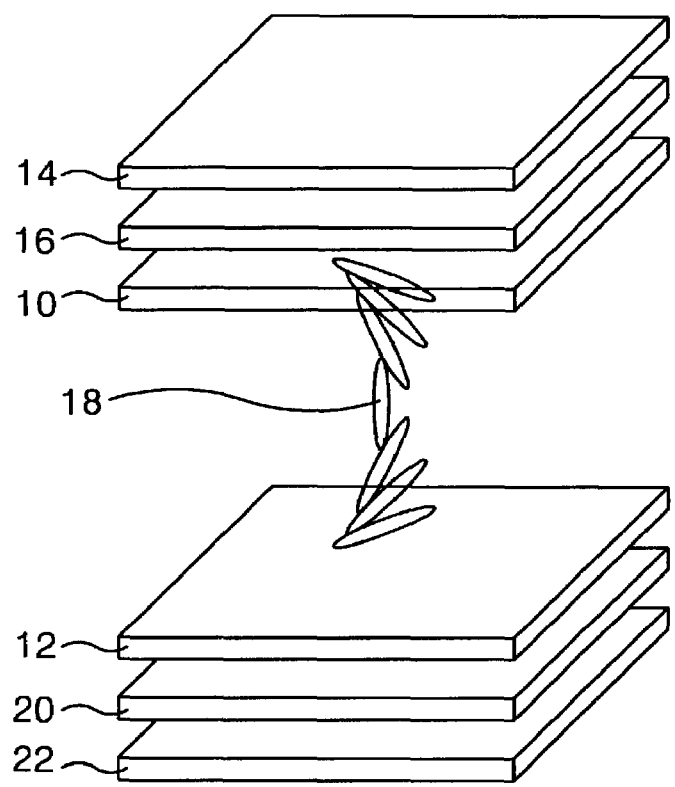
FIG. 2 illustrates a liquid crystal cell of FIG. 1.
Figure 3:
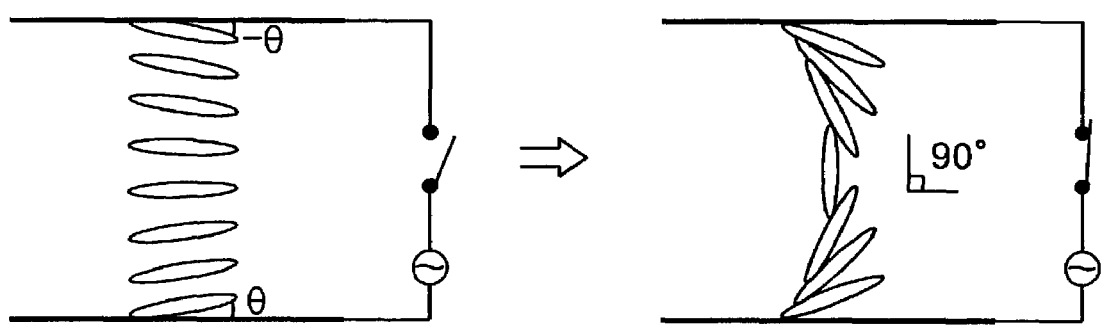
FIG. 3 depicts a liquid crystal alignment state of the OCB mode for liquid crystal according to electric fields supplied to the liquid crystal cell shown in FIG. 2.
Figure 4:
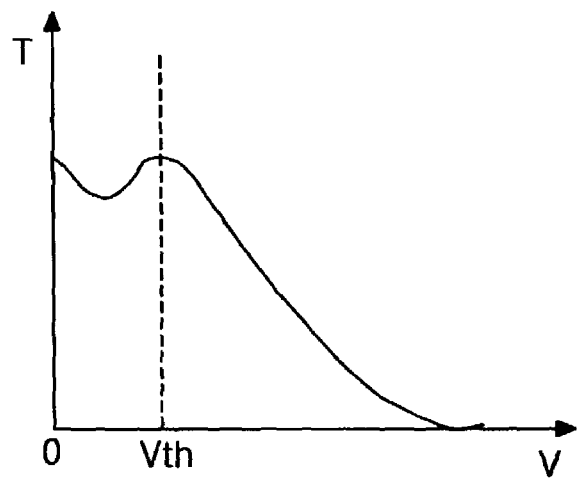
FIG. 4 is a graph representing a relationship of light transmittance through the liquid crystal cell of FIG. 2 to a voltage in the OCB mode.
Figure 5:
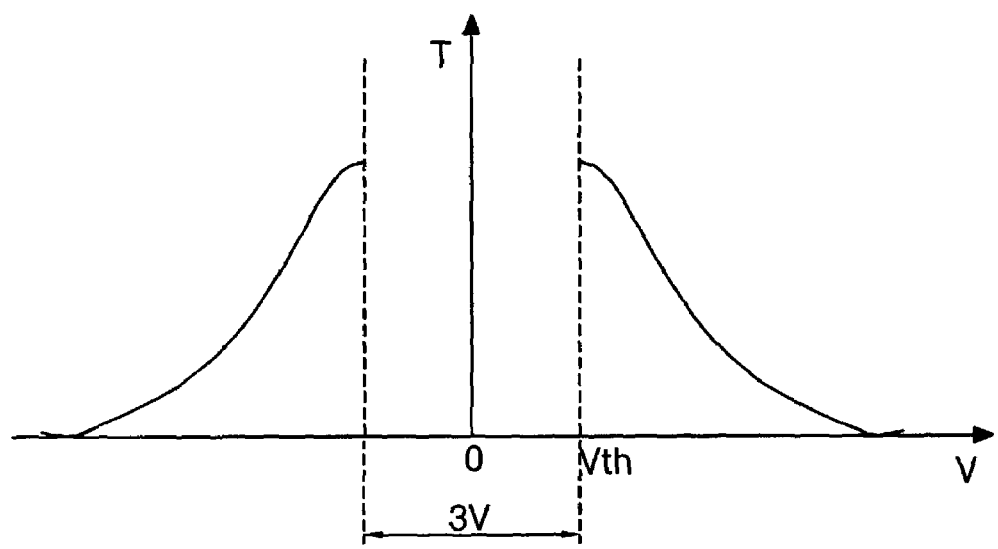
FIG. 5 is a graph representing voltages when a liquid crystal of the OCB mode for a liquid crystal cell is switched into a bend state.
Figure 6:
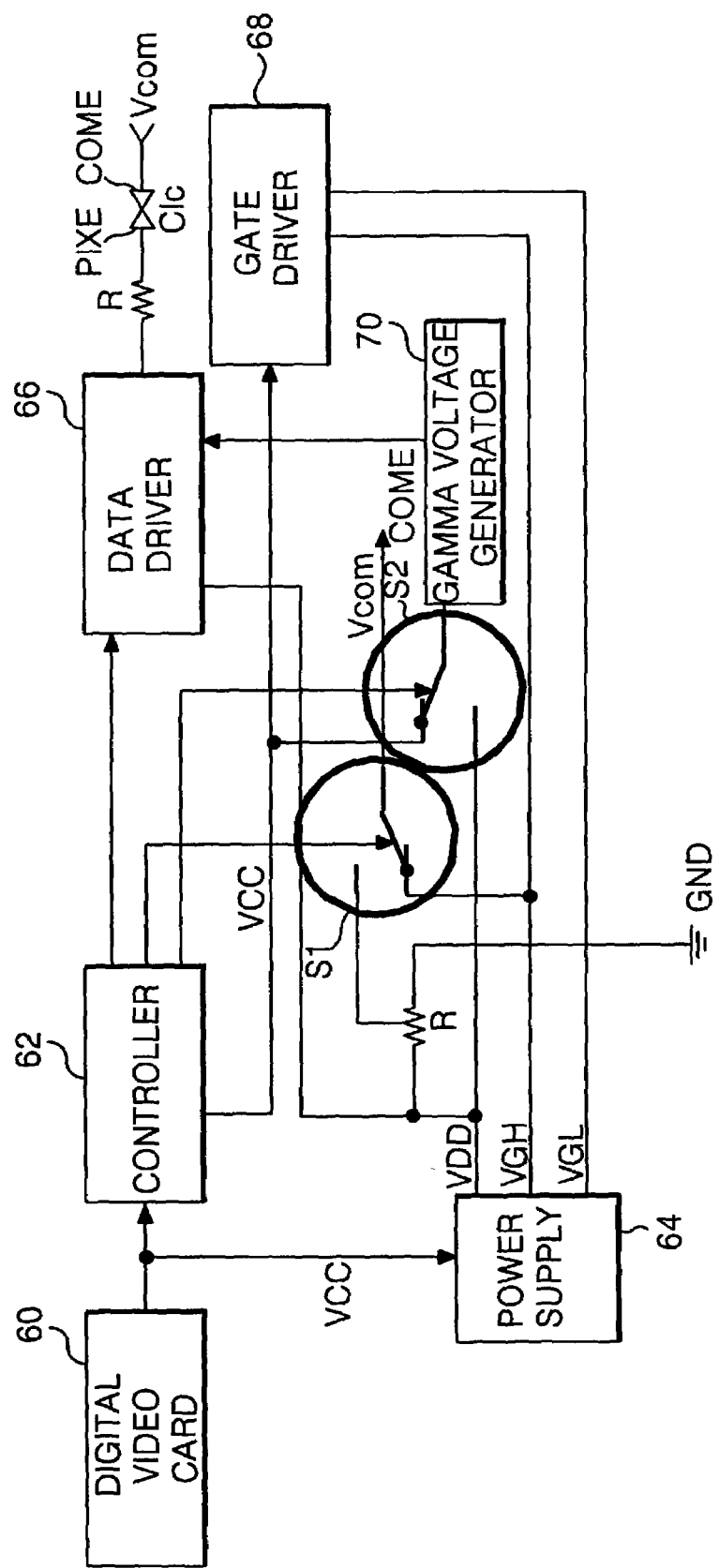
FIG. 6 is a block circuit diagram of a reset circuit of a liquid crystal display according to a first embodiment of the present invention.
Figure 7:
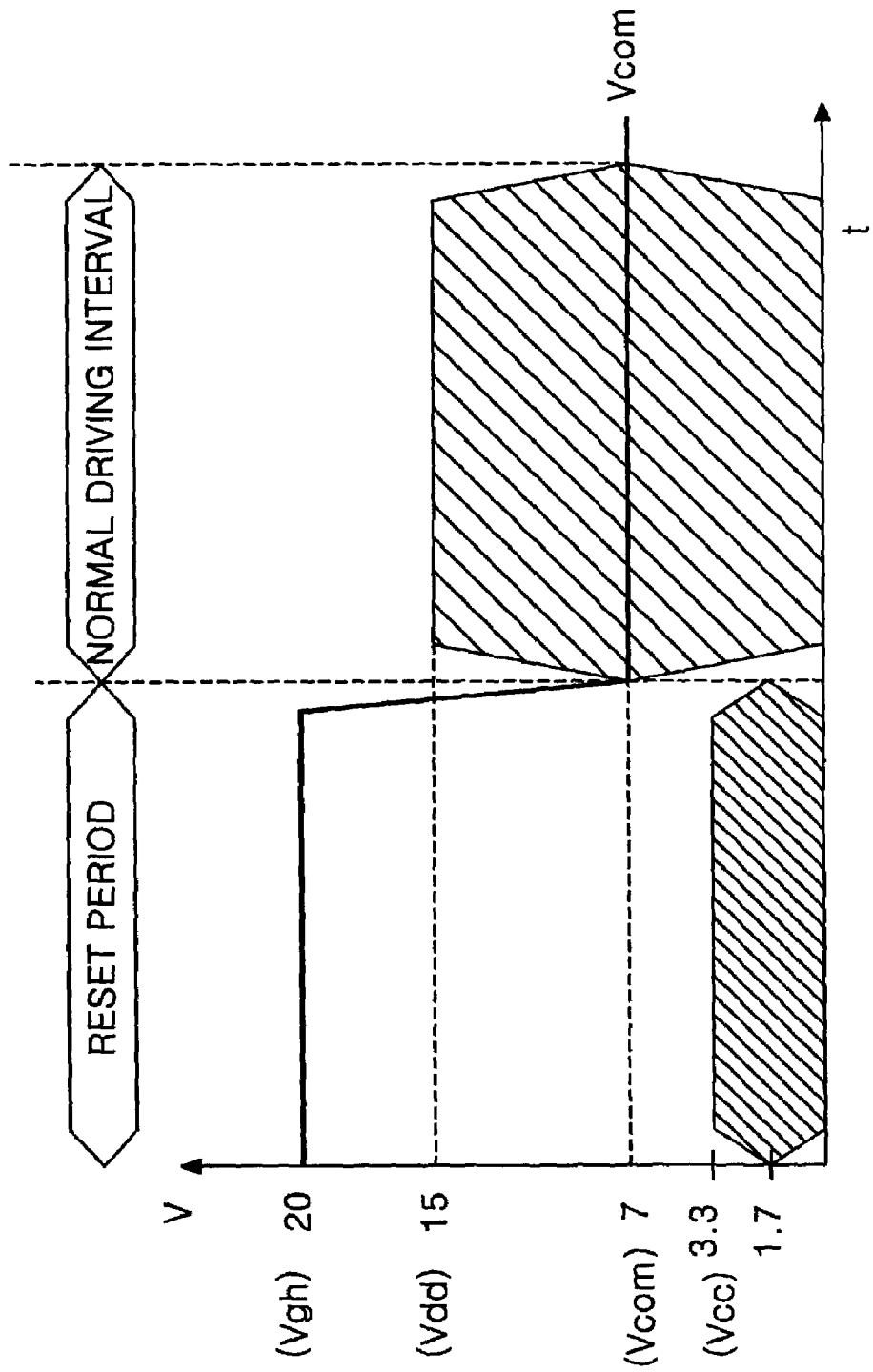
FIG. 7 represents voltages according to the reset circuit shown in FIG. 6 during a reset period.

Referring to FIG. 6 and FIG. 7, a liquid crystal display (LCD) according to a first embodiment of the present invention increases the voltage difference between a common electrode and a pixel electrode during a reset period. Liquid crystal molecules are rapidly transitioned from a splay state into a bend state during the reset period such that the liquid crystal is in the bend state for the next normal driving interval. To this end, a liquid crystal cell in the OCB mode includes a reset circuit.

As shown in FIG. 6, the reset circuit includes a digital video card 60 for converting an analog signal into a digital video data, a power supply 64 for applying driving voltages, a data driver 66 for supplying a video data to data lines of a LCD panel (not shown), a gate driver 68 for sequentially driving gate lines GL of the LCD panel, a controller 62 for controlling the data driver 66 and the gate driver 68, a gamma voltage generator 70 for applying a gamma voltage to the data driver 66, a first switch S1 for selecting a common voltage Vcom to be supplied to a common electrode, and a second switch S2 for selecting a reference voltage used in supplying a pixel voltage to a pixel electrode.

In the LCD panel, a liquid crystal is injected between two glass substrates. The gate lines GL and the data lines DL are formed on the lower glass substrate in such a manner to be perpendicular to each other. In an area adjacent to an intersection between each of the gate lines GL and the data lines DL, a thin film transistor (TFT) is positioned for selectively applying image data inputted from the data lines DL to a liquid crystal cell. To this end, the TFT has a gate terminal (not shown), connected to the gate line GL and a source terminal (not shown) connected to the data line DL. The drain terminal (not shown) of the TFT is connected to a pixel electrode of a liquid crystal cell.

The digital video card 60 converts an analog image signal into a digital image signal suitable for a liquid crystal display panel and detects a synchronous signal included in the image signal. The controller 62 receives a driving voltage a driving voltage of 0~3.3V from the digital video card 60. The controller 62 supplies red, green and blue digital video data to the data driver 66. Further, the controller 62 generates a dot clock Dclk and a gate start pulse GSP using horizontal/vertical synchronizing signals H and V inputted from the digital video card 60 to provide a timing control of the data driver 66 and the gate driver 68. More particularly, the dot clock Dclk controls the data driver 66 while the gate start pulse GSP controls to the gate driver 68.

The power supply 64 receives a low-level common voltage VCC of 0~3.3V supplied from the digital video card 60 to generate a driving voltage for driving the liquid crystal cells and the gate driver 68. The power supply 64 converts a low-level common voltage VCC of 0~3.3V into a high level common voltage VDD of 15V. In accordance with a selection of a second switch S2 controlled from the controller 62, the voltage VDD or a low-level voltage VCC of 0~3.3V is supplied as reference voltage for the pixel electrode via the gamma voltage generator 70 and the data driver 66.

The gamma voltage generator 70 generates a gamma voltage Vγ in correspondence with a gray level value of a data in consideration of both electrical and optical characteristics of the LCD panel. The dot clock Dclk from the controller 62, along with red, green and blue digital video data, is inputted to the data driver 66. The data-driver 66 latches the red, green and blue digital video data in synchronization with the dot clock Dclk, and then corrects the latched data in accordance with the gamma voltage Vγ. Further, the data driver 66 converts the respective red, green and blue digital data corrected by the gamma voltage Vγ to respective red, green and blue analog data for application to the data lines DL of the LCD panel.

The power supply 64 produces a gate high voltage VGH and a gate low voltage VGL for a scanning signal in correspondence with a gate-scanning clock GSC. For example, the power supply 64 converts the low-level common voltage VCC of 0~3.3V into a gate high voltage VGH of 20V and a gate low voltage VGL of −5V to supplies them to the gate driver 68.

The gate driver 68 includes a shift register for responding to a gate start pulse GSP inputted from the controller 62 to sequentially generate a scanning pulse, and a level shifter for shifting a voltage of the scanning pulse into a voltage level suitable for driving a liquid crystal cell. The gate driver 68 supplies a gate high voltage VGH and a gate low voltage VGL to the liquid crystal display panel 40 for application to any one of the gate lines GL. This scanning pulse with a gate high voltage VGH turns on a TFT switch, and provides video data supplied from the data driver 66 into the liquid crystal cell.

In accordance with a selection of a first switch S1 controlled from the controller 62 with a controller signal, either a reduced voltage divided from the high level common voltage VDD with a resistor or the gate high voltage VGH is coupled with the common electrode. When the first switch S1 selects the reduced voltage divided from the high level common voltage VDD with a resistor, a common voltage Vcom of 0~7V is supplied to the common electrode. Otherwise, when the first switch S1 selects the gate high voltage VGL, a gate high voltage VGH of 20V is supplied to the common electrode.

In accordance with a selection of a second switch S2 controlled from the controller 62 with a control signal, either the low-level common voltage VCC or the high level common voltage VDD is used as the reference voltage for the pixel electrode. When the second switch S2 is coupled with the low-level common voltage VCC, the low-level common voltage VCC is supplied as the reference voltage via the gamma voltage generator 70 to the data driver 66 for supplying a real-data signal of 0~3.3V to the pixel electrode. On the other hand, when the second switch S2 is coupled to the high level common voltage VDD, the high level common voltage VDD is supplied as the reference voltage via the gamma voltage generator 70 to the data driver 66 for applying a real-data signal of 0~15V to the pixel electrode.

In a liquid crystal of the liquid crystal cell with the OCB mode, a transition time from the splay state into the bend state becomes faster as a difference between the pixel voltage and the common voltage is increased. An experimental result showing a relationship of a transition time versus a voltage difference across the liquid crystal cell is shown in the following table.

TABLE 1

| Voltage Difference (V) | 4 | 5 | 6 | 7 | 8 | 9 | 10 | 15 |
|---|---|---|---|---|---|---|---|---|
| Transition Time (sec) | 80 | 44 | 12 | 4 | 2 | 1.2 | 0.5 | 0.1 |

Figure 8:
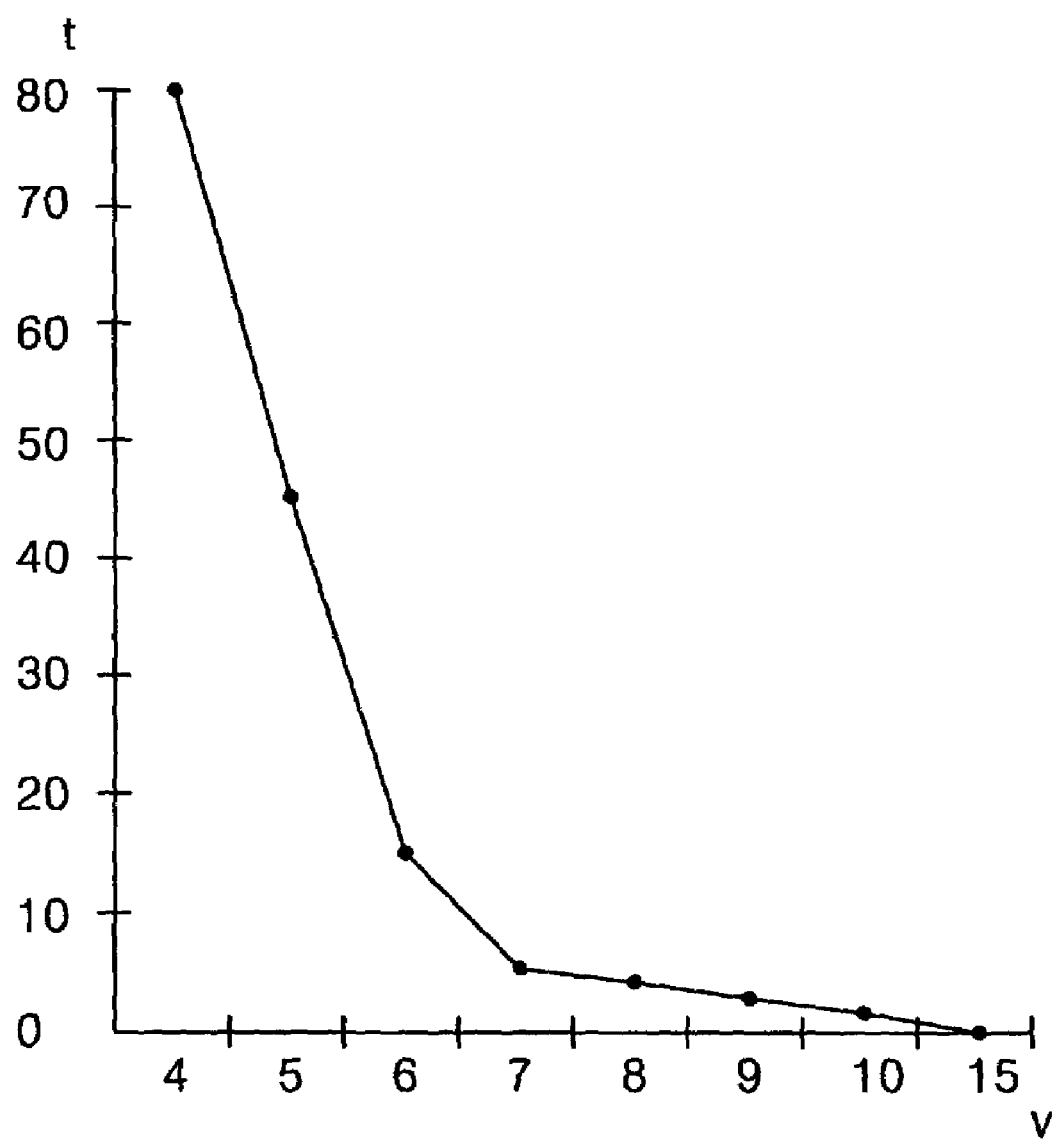
FIG. 8 is a graph representing transition time versus voltage difference within a liquid crystal cell for transition to a bend state.

Referring to Table 1 in conjunction with FIG. 8, it can be seen that, as the voltage difference or electric field across the liquid crystal cell is increased, the time required for transitioning the liquid crystal from the splay state into the bend state decreases. Therefore, increasing a voltage between the pixel electrode and the common electrode of liquid crystal cell during a reset period can result in rapid transition from the splay state into the bend state within the liquid crystal.

For example, in response to a control signal from the controller 62 in the reset period, the first switch S1 is coupled with the gate high voltage VGH to supply the gate high voltage VGH to the common electrode while the second switch S2 is coupled with the low-level common voltage VCC as the reference voltage to supply the low-level common voltage VCC to the pixel electrode via the gamma voltage generator 70 and the data driver 66. Thus, a gate high voltage VGH of 20V is supplied to the common electrode and real-data signal having a change width of 0~3.3V is supplied to the pixel electrode. If an average voltage of 1.7V is assumed for the convenience of explanation, then a voltage difference of about 18V is generated across the liquid crystal. In this case, the liquid crystal molecules are transitioned from the splay state into the bend state with a transition time below about 0.1 sec, as shown in FIG. 8.

After the reset period, there is a normal driving interval in which the pixel common voltage Vcom of about 7V is supplied to the common electrode while a real-data signal is supplied to the pixel electrode. During the normal driving interval, the liquid crystal molecules are controlled from the bend state in accordance with a control signal of the controller 62. As shown in FIG. 7, the voltage difference between the pixel electrode and the common electrode during the reset period is on average larger than the real-data signal in said normal driving interval. Thus, the liquid crystal can be transitioned from the splay state into the bend state in a short time during the reset period.

Figure 9:
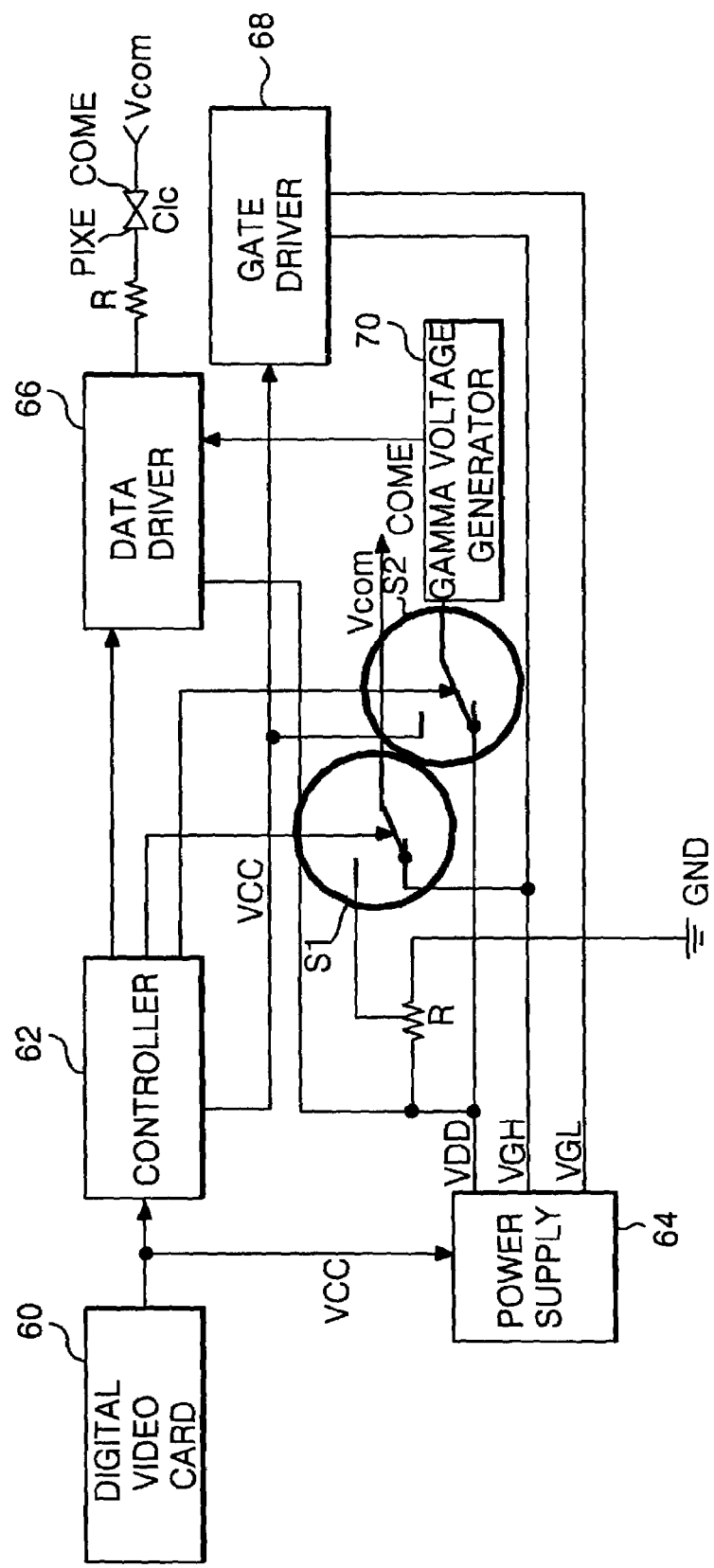
FIG. 9 is a block circuit diagram of a reset circuit according to a second embodiment of the present invention.
Figure 10:
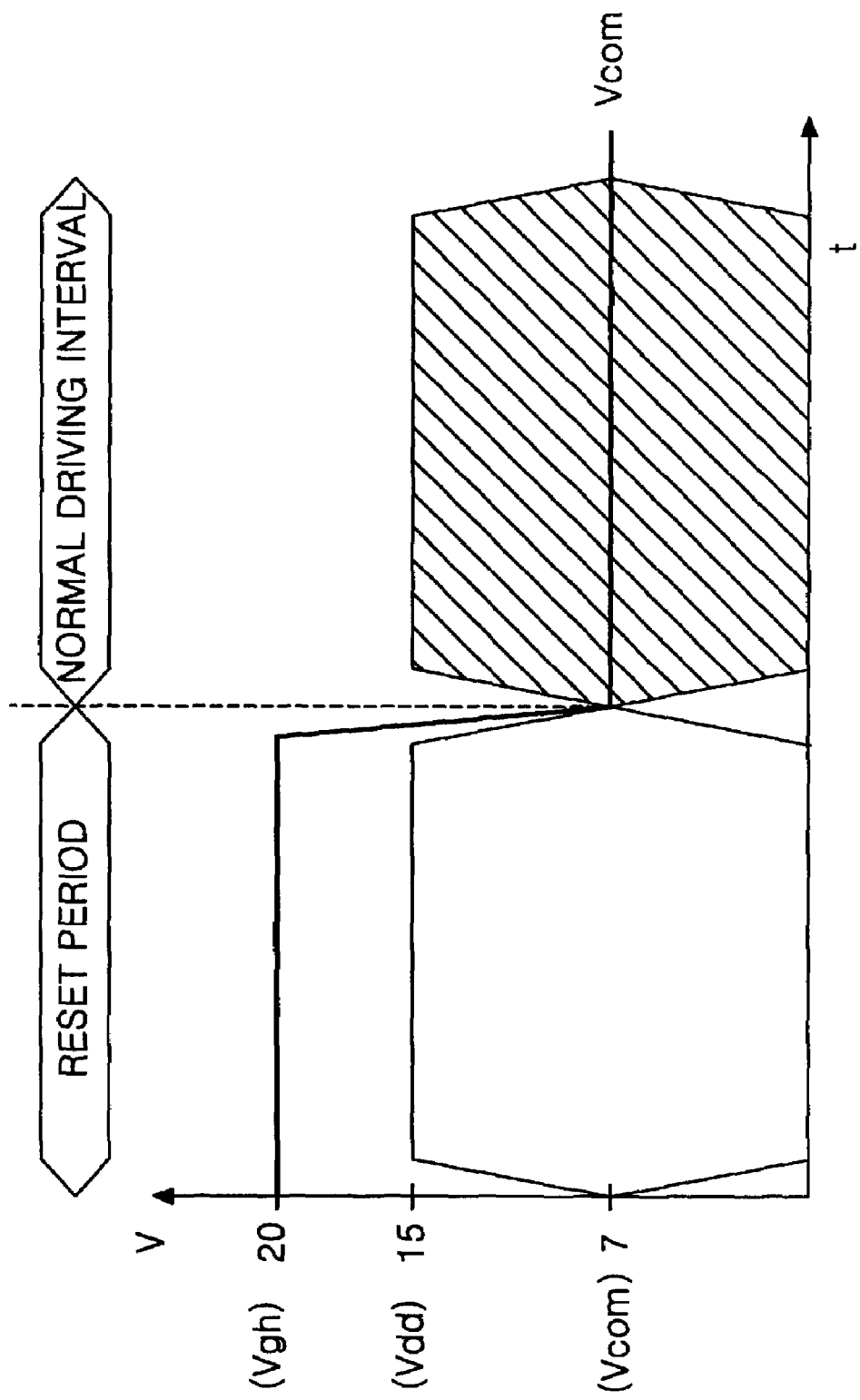
FIG. 10 represents voltages from the reset circuit shown in FIG. 9 during a reset period.

In a second embodiment, as shown in FIG. 9, in the reset period, the first switch S1 couples the gate high voltage VGH to the common electrode as the common voltage Vcom while the second switch S2 couples the high level common voltage VDD as the reference voltage for use on the pixel electrode. The first switch S1 is coupling to the gate high voltage VGH in response to a control signal from the controller 62 to apply the gate high voltage VGH to the common electrode. The second switch S2 is coupling to the high level common voltage VDD as the reference voltage to supply the high level common voltage VDD to the pixel electrode via the gamma voltage generator 70 and the data driver 66. Thus, as shown in FIG. 10, a voltage of 20V is supplied to the common electrode with a real-data signal having a change width of 0~15V is supplied to the pixel electrode. If an average voltage of 7V is assumed for the convenience of explanation, then a voltage difference of about 13V occurs across the liquid crystal cell. In this case, as shown in FIG. 8, the liquid crystal molecules are transitioned from the splay state into the bend state in a time of less than 0.5 sec.

After the reset period, there is a normal driving interval in which the pixel common voltage Vcom of about 7V is supplied to the common electrode while a real-data signal is supplied to the pixel electrode. During the normal driving interval, the liquid crystal molecules are controlled from the bend state in accordance with a control signal of the controller 62. As shown in FIG. 10, the voltage difference between the pixel electrode and the common electrode during the reset period is larger than an average voltage of the real-data signal in said normal driving interval. Therefore, the liquid crystal can be transitioned from the splay state into the bend state in a short time during the reset period.

Figure 11:
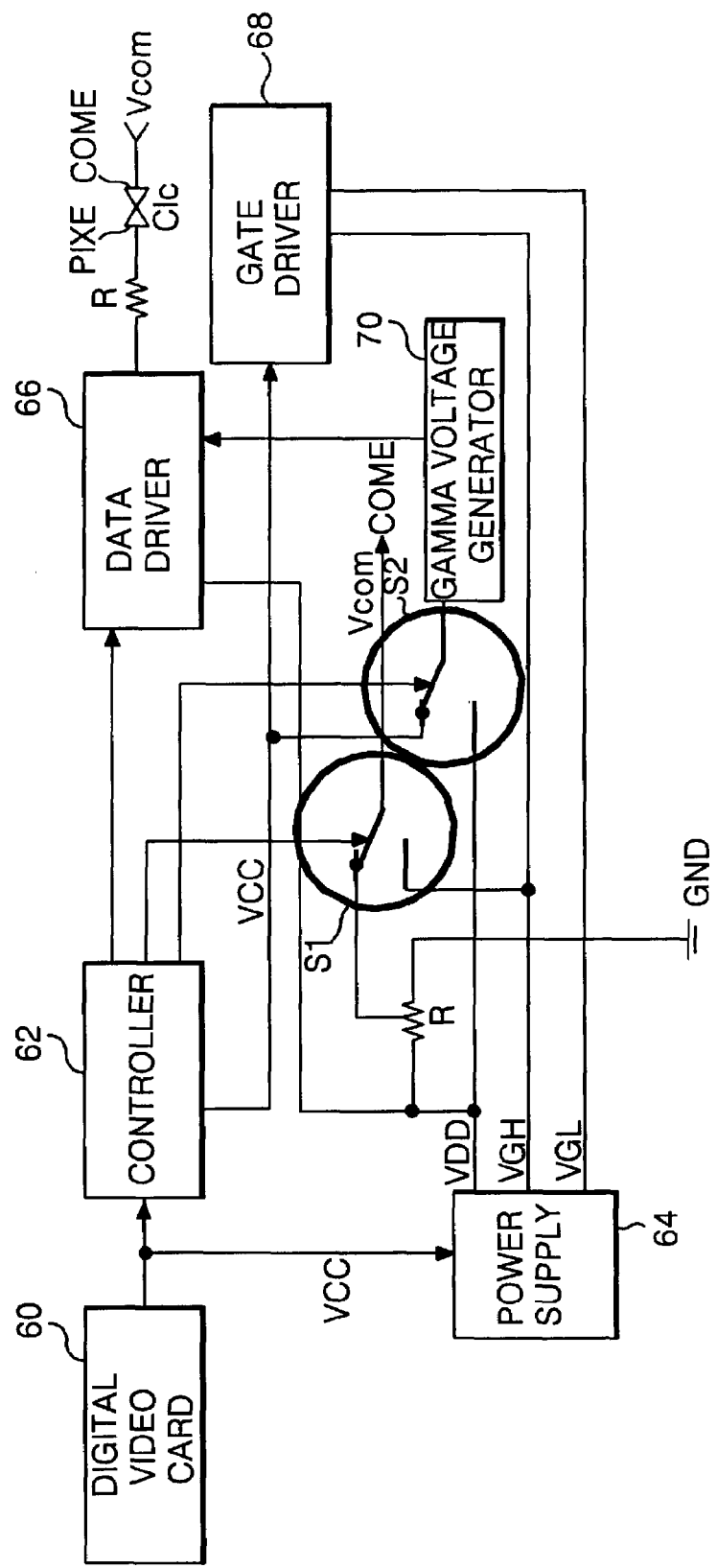
FIG. 11 is a block circuit diagram of a reset circuit according to a third embodiment of the present invention.
Figure 12:
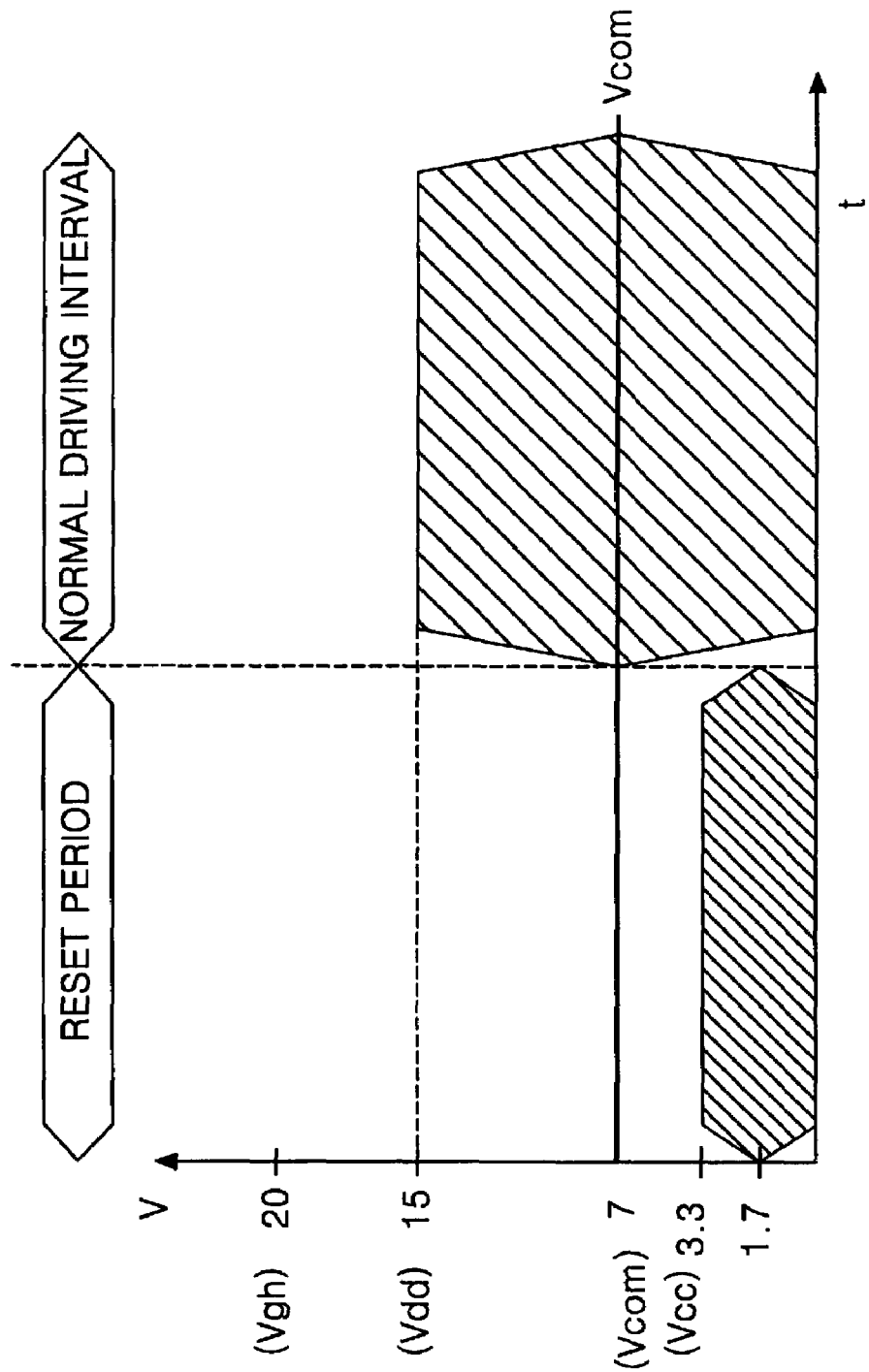
FIG. 12 represents voltages from the reset circuit shown in FIG. 11 during a reset period.

In a third embodiment, as shown in FIG. 11, the first switch S1 is coupled to a reduced voltage divided from the high level common voltage VDD with a resistor while the second switch S2 is coupled to a low-level common voltage VCC. In response to a control signal from the controller 62, the first switch S1 couples the reduced voltage divided from the high level common voltage VDD with a resistor to supply the pixel common voltage Vcom to the common electrode. The second switch S2 couples the low-level common voltage VCC as the reference voltage for use on the pixel electrode. Thus, as shown in FIG. 12, a voltage of 7V is supplied to the common electrode and a real-data signal having a change width of 0~3.3V is supplied to the pixel electrode. If it is assumed that there is an average voltage of 1.7V for the convenience of explanation, then there is a voltage difference of about 5~6V across the liquid crystal cell. In this case, the liquid crystal molecules are transitioned from the splay state into the bend state in about 12~44 sec as shown in FIG. 8.

After the reset period, a common voltage Vcom of about 7V is supplied to the common electrode while a real-data signal is supplied to the pixel electrode so as to provide normal driving of the liquid crystal molecules from the bend state during the normal driving interval in accordance with a control signal of the controller 62. As shown in FIG. 12, the voltage difference between the pixel electrode and the common electrode during the reset period is larger than an average voltage of the real-data signal in said normal driving interval. Therefore, the liquid crystal can be transitioned from the splay state into the bend state in a short time during the reset period.

Figure 13:
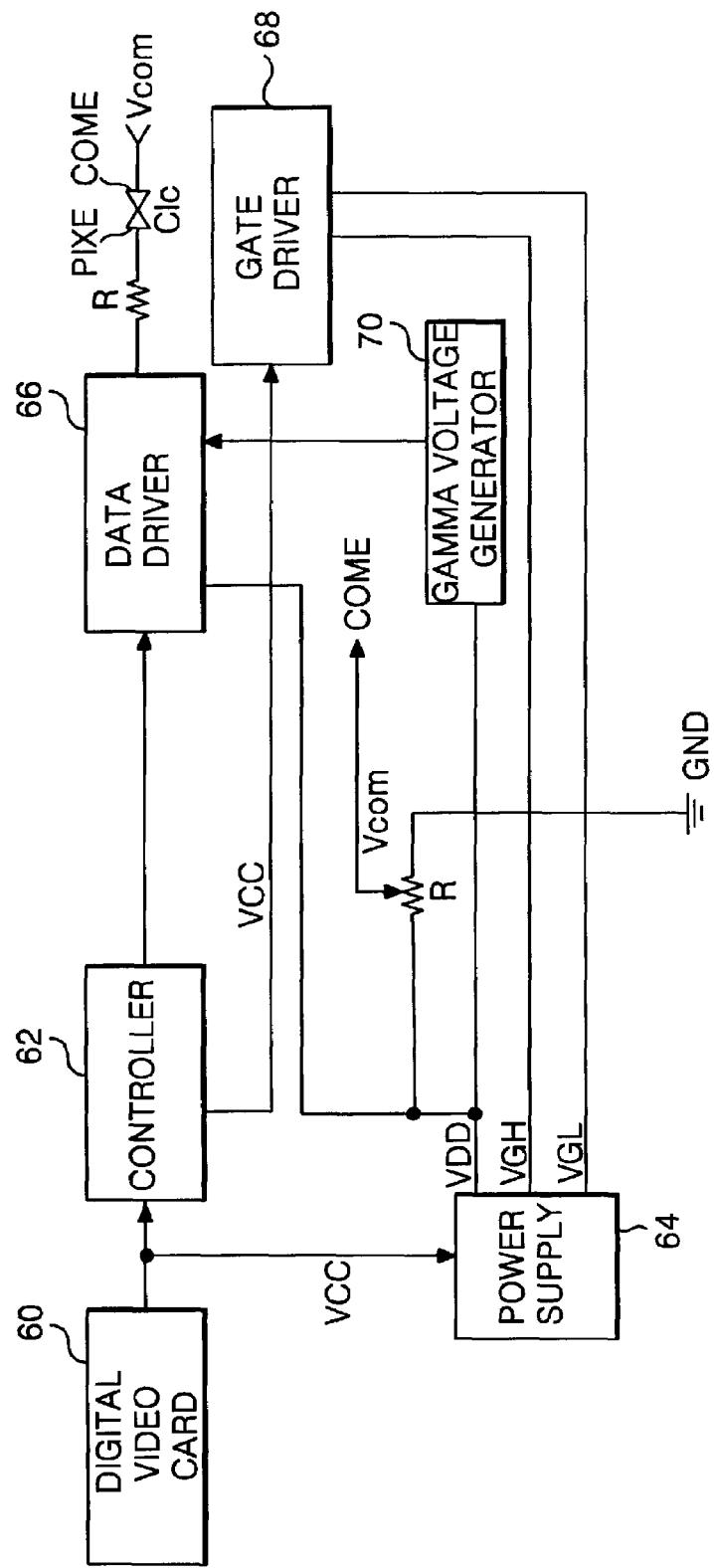
FIG. 13 is a block circuit diagram of a reset circuit according to a fourth embodiment of the present invention.

Referring to FIG. 13, a LCD according to a fourth embodiment of the present invention applies a maximum driving voltage supplied in the normal driving interval to the pixel electrode in the reset period, thereby allowing the liquid crystal molecules to rapidly transition from the splay state into the bend state. To this end, a liquid crystal cell in the OCB mode includes a reset circuit as shown in FIG. 13.

The reset circuit includes a digital video card 60 for converting an analog video signal into a digital video data, a power supply 64 for applying a driving voltage, a data driver 66 for supplying video data to data lines of a liquid crystal display panel (not shown), a gate driver 68 for sequentially driving gate lines GL of the liquid crystal display panel, a controller 62 for controlling the data driver 66 and the gate driver 68, a gamma voltage generator 70 for supplying a gamma voltage to the data driver 66, a resistor R for providing to the common electrode a reduced voltage as common voltage Vcom, which is the high level common voltage VDD divided with a resistor R.

In the liquid crystal display panel, a liquid crystal is injected between two glass substrates, and the gate lines GL and the data lines DL are formed on the lower glass substrate in such a manner as to be perpendicular to each other. The digital video card 60 converts an analog input image signal into a digital image signal suitable for the liquid crystal display panel and detects a synchronous signal included in the analog image input signal. The controller 62 receives a driving voltage of 0~3.3V from the digital video card 60. The controller 62 supplies red, green and blue digital video data to the data driver 66. Further, the controller 62 generates a dot clock Dclk and a gate start pulse GSP using horizontal/vertical synchronizing signals H and V inputted from the digital video card 60 to provide a timing control of the data driver 66 and the gate driver 68. More particularly, the dot clock Dclk controls the data driver 66 while the gate start pulse GSP controls the gate driver 68.

The power supply 64 receives a low-level common voltage VCC of 0~3.3V supplied from the digital video card 60 to generate a high level common voltage VDD for driving the liquid crystal cells and voltages for driving the gate driver 68. The high level common voltage VDD is divided into a reduced voltage for a common voltage Vcom of 7V by a voltage-dividing resistor R, and the common voltage Vcom is supplied via an Ag dot provided at the pad portion of the liquid crystal display panel to the common electrode provided on the upper substrate of the liquid crystal display panel. The power supply 64 produces a gate high voltage VGH and a gate low voltage VGL of a scanning signal in accordance with a gate-scanning clock GSC. For example, the power supply 64 converts the supplied low-level common voltage VCC of 0~3.3V into a gate high voltage VGH of 20V and a gate low voltage VGL of −5V. Both the gate high voltage VGH and the gate low voltage VGL of −5V are supplied to the gate driver 68.

The gate driver 68 includes a shift register for responding to the gate start pulse GSP inputted from the controller 62 to sequentially generate a scanning pulse, and a level shifter for shifting a voltage of the scanning pulse into a voltage level suitable for a driving of the liquid crystal cell. The gate driver 68 supplies a gate high voltage VGH and a gate low voltage VGL to the liquid crystal display panel 40 along the gate lines GL. This scanning pulse with a gate high voltage VGL turns on a TFT switch, and provides video data supplied from the data driver 66 into the liquid crystal cell.

The dot clock Dclk from the controller 62, along with red, green and blue digital video data, are inputted to the data driver 66. The data driver 66 latches the red, green and blue digital video data in synchronization with the dot clock Dclk, and then corrects the latched data in accordance with a gamma voltage Vγ. Further, the data driver 66 converts a data corrected by the gamma voltage Vγ to an analog data to apply it to the data lines DL for each one line.

Figure 14:
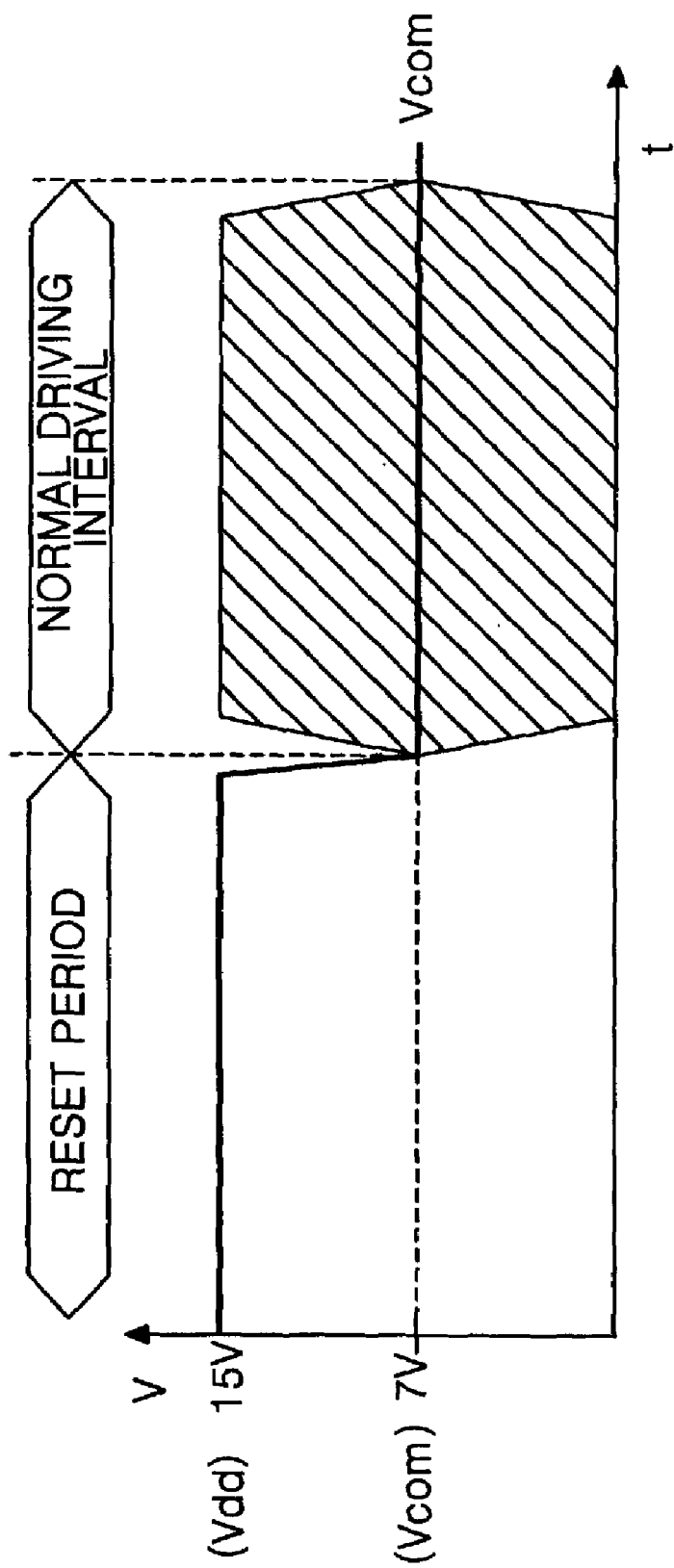
FIG. 14 represents voltages from the reset circuit shown in FIG. 13 during a reset period.

As shown in FIG. 14, in the reset period, a maximum driving voltage of 15V fed to the data driver 66 is supplied to the pixel electrode in response to a control signal from the controller 62. Further, a reduced voltage for a common voltage Vcom of 7V is supplied to the common electrode of the liquid crystal cell. The controller 62 generates a control signal for providing a delay such that the real-data signal is not supplied to the pixel electrode during the reset period. The real-data signal is only supplied in the normal driving interval in response to this control signal. In other words, after the reset period, a voltage of 7V is supplied to the common electrode and a real-data signal is used with the pixel electrode in the normal driving interval.

As shown in FIG. 14, a maximum voltage of the real-data signal is supplied to the pixel electrode in the reset period, thereby allowing a voltage difference across the liquid crystal in the reset period to be set to the largest voltage difference across the liquid crystal cell that may be obtained during real driving. The voltage supplied to the pixel electrode during the reset period is a maximum constant driving voltage while a real-data signal supplied to the pixel electrode upon real driving is varied, an average value of which is smaller than the maximum driving voltage supplied during the reset period. Thus, the voltage difference between the pixel electrode and the common electrode during the reset period is larger than an average voltage of the real-data signal in said normal driving interval, so that the liquid crystal can be rapidly transitioned from the splay state into the bend state during the reset period.

As described above, according to the present invention, the maximum constant driving voltage supplied to the liquid crystal cell in the reset period is larger than an average voltage of the real-data signal supplied during normal driving in the liquid crystal display. Accordingly, a liquid crystal can be rapidly transitioned from the splay state into the bend state.

It will be apparent to those skilled in the art that various modifications and variations can be made in the apparatus and method for fabricating a liquid crystal display of the present invention without departing from the spirit or scope of the invention. Thus, it is intended that the present invention cover the modifications and variations of this invention provided they come within the scope of the appended claims and their equivalents.

What is claimed is:

1. A method of driving a liquid crystal display that includes a normal driving interval for providing normal driving of the liquid crystal display with a real-data signal after a reset period, wherein the liquid crystal display includes a liquid crystal between pixel and common electrodes in which the liquid crystal is transitioned from a splay state into a bend state at a voltage difference between the pixel and common electrodes greater than a transition voltage, said method comprising the steps of:

setting a voltage difference between the pixel and common electrodes during the reset period to be larger than an average voltage of the real-data signal in said normal driving interval using a data driver that drives the pixels during the normal driving interval;

applying said voltage difference across the liquid crystal such that the liquid crystal is transitioned from the splay state into the bend state during the reset period; and driving the liquid crystal from the bend state after the reset period in the normal driving interval, wherein said step of setting a voltage difference includes switching the common electrode to a gate high voltage, which is greater than a maximum voltage of the real-data signal during the normal driving interval, and switching a reference voltage for driving the pixel electrode to a low-level common voltage, which is less than the maximum voltage of the real-data signal during the normal driving interval.

2. A method of driving a liquid crystal display that includes a normal driving interval for providing normal driving of the liquid crystal display with a real-data signal after a reset period, wherein the liquid crystal display includes a liquid crystal between pixel and common electrodes in which the liquid crystal is transitioned from a splay state into a bend state at a voltage difference between the pixel and common electrodes greater than a transition voltage, said method comprising the steps of:

setting a voltage difference between the pixel and common electrodes during the reset period to be larger than an average voltage of the real-data signal in said normal driving interval using a data driver that drives the pixels during the normal driving interval;

applying said voltage difference across the liquid crystal such that the liquid crystal is transitioned from the splay state into the bend state during the reset period; and driving the liquid crystal from the bend state after the reset period in the normal driving interval, wherein said step of setting a voltage difference includes switching the common electrode to a gate high voltage, which is greater than a maximum voltage of the real-data signal during the normal driving interval, and applying a high level common voltage as reference voltage for driving the pixel electrode, wherein the high level common voltage is same as a maximum voltage of the real-data signal during the normal driving interval.

3. A method of driving a liquid crystal display that includes a normal driving interval for providing normal driving of the liquid crystal display with a real-data signal after a reset period, wherein the liquid crystal display includes a liquid crystal between pixel and common electrodes in which the liquid crystal is transitioned from a splay state into a bend state at a voltage difference between the pixel and common electrodes greater than a transition voltage, said method comprising the steps of:

setting a voltage difference between the pixel and common electrodes during the reset period to be larger than an average voltage of the real-data signal in said normal driving interval using a data driver that drives the pixels during the normal driving interval;

applying said voltage difference across the liquid crystal such that the liquid crystal is transitioned from the splay state into the bend state during the reset period; and driving the liquid crystal from the bend state after the reset period in the normal driving interval, wherein said step of setting a voltage difference includes switching a reference voltage for driving the pixel electrode to a low-level common voltage, which is less than the maximum voltage of the real-data signal during the normal driving interval.

4. A method of driving a liquid crystal display that includes a normal driving interval for providing normal driving of the liquid crystal display with a real-data signal after a reset period, wherein the liquid crystal display includes a liquid crystal between pixel and common electrodes in which the liquid crystal is transitioned from a splay state into a bend state at a voltage difference between the pixel and common electrodes greater than a transition voltage, said method comprising the steps of:

setting a voltage difference between the pixel and common electrodes during the reset period to be larger than an average voltage of the real-data signal in said normal driving interval using a data driver that drives the pixels during the normal driving interval;

applying said voltage difference across the liquid crystal such that the liquid crystal is transitioned from the splay state into the bend state during the reset period; and driving the liquid crystal from the bend state after the reset period in the normal driving interval, wherein said step of setting a voltage difference includes delaying the real-data signal during the reset period, and applying a constant maximum voltage as a reference voltage for driving the pixel electrode, wherein the constant maximum voltage is same as a maximum voltage of the real-data signal during the normal driving interval.

5. An apparatus for driving a liquid crystal display that includes a normal driving interval for providing normal driving of the liquid crystal display with a real-data signal after a reset period, wherein the liquid crystal display includes a liquid crystal between pixel and common electrodes in which the liquid crystal is transitioned from a splay state into a bend state at a voltage difference between the pixel and common electrodes greater than a transition voltage, said apparatus comprising:

a reset circuit for setting a voltage difference between the pixel electrode and the common electrode during the reset period to be larger than an average voltage of the real-data signal in said normal driving interval using a data driver that drives the pixels during the normal driving interval; and a controller for controlling voltages that are supplied to at least one of the pixel electrode and the common electrode, wherein the controller delays the real-data signal and applies a constant maximum voltage as a reference voltage for driving the pixel electrode while applying a same voltage to the common electrode as a voltage applied to the common electrode during the normal driving interval.

6. The apparatus according to claim 5, wherein the reset circuit includes at least one switching device for applying different voltages to at least one of the pixel electrode and the common electrode in accordance with a control signal from the controller.

7. The apparatus according to claim 6, wherein the reset circuit includes a first switch that switches the common electrode to a gate high voltage, which is greater than a maximum voltage of the real-data signal during the normal driving interval; and a second switch that switches a second reference voltage for driving the pixel electrode to a low-level common voltage, which is less than the maximum voltage of the real-data signal during the normal driving interval.

8. The apparatus according to claim 6, wherein the reset circuit includes a first switch that switches the common electrode to a gate high voltage, which is greater than a maximum voltage of the real-data signal during the normal driving interval.

9. The apparatus according to claim 6, wherein the reset circuit includes a first switch that switches a reference voltage for driving the pixel electrode to a low-level common voltage, which is less than the maximum voltage of the real-data signal during the normal driving interval.

10. The apparatus according to claim 5, wherein the reset circuit includes:
- a first switch connected to a gamma voltage generator, wherein the first switch selects a reference voltage used in a driving circuit for a pixel electrode; and
- a second switch for switching a voltage of the common electrode.

11. A reset circuit for setting a voltage difference between a pixel electrode and a common electrode in a liquid crystal display, comprising:
- a driving circuit for driving the pixel electrode;
- a gamma voltage generator connected to the driving circuit;
- a first switch connected to the common electrode, wherein the first switch selects between a first voltage and a second voltage;
- a second switch connected to a gamma voltage generator, wherein the second switch selects between a third voltage and a fourth voltage as a reference voltage used by the gamma voltage generator;
- a controller for controlling a voltage difference between the pixel electrode and the common electrode using the first and second switches; and
- a gate driver for driving the gates of thin film transistors in the liquid crystal display, wherein the third voltage is same as a power voltage supplied to at least one of the gate driver and controller.

12. The reset circuit according to claim 11, wherein the fourth voltage is same as a power voltage supplied to the data driver.

13. The reset circuit according to claim 12, wherein the first voltage is voltage divided from the fourth voltage.

14. The reset circuit according to claim 11, wherein the second voltage is same as a gate high voltage supplied to the gate driver that is used in a scanning signal corresponding with a gate-scanning clock in the gate driver.

15. The reset circuit according to claim 11, wherein the first voltage is voltage divided from the fourth voltage using a resistor.

* * * * *